United States Patent [19]

Bouron

[11] Patent Number: 4,847,608
[45] Date of Patent: Jul. 11, 1989

[54] GRAPHIC DISPLAY DEVICE

[75] Inventor: Jean P. Bouron, Ville d'Avray, France

[73] Assignee: Thomson-CSF, Paris, France

[21] Appl. No.: 914,421

[22] Filed: Oct. 2, 1986

[30] Foreign Application Priority Data

Oct. 8, 1985 [FR] France ................................ 85 14881

[51] Int. Cl.$^4$ .............................................. G09G 1/00
[52] U.S. Cl. .................... 340/747; 340/703; 340/745; 340/739
[58] Field of Search ............... 340/739, 703, 750, 747, 340/745, 744, 736; 364/521

[56] References Cited

U.S. PATENT DOCUMENTS

| | | | |
|---|---|---|---|
| 3,585,628 | 6/1971 | Harrison | 340/739 |
| 4,297,691 | 10/1981 | Kodama et al. | |
| 4,447,809 | 5/1984 | Kodama et al. | 340/703 |
| 4,481,594 | 11/1984 | Staggs et al. | 340/703 |
| 4,491,835 | 1/1985 | Aron | 340/739 |
| 4,496,976 | 1/1985 | Swanson et al. | 340/750 |
| 4,499,457 | 2/1985 | Hintze | 340/739 |
| 4,593,278 | 6/1986 | Koos, Jr. et al. | 340/747 |
| 4,631,532 | 12/1986 | Grothe | 340/703 |
| 4,679,038 | 7/1987 | Bantz et al. | 340/750 |
| 4,682,160 | 7/1987 | Beckwith, Jr. et al. | 340/747 |
| 4,703,439 | 10/1987 | Lotz | 340/747 |

OTHER PUBLICATIONS

IEEE Transactions on Computers, vol. C-28, No. 7, Jul. 1979, pp. 528-531, "An Area Shading Graphics Display System".
IEEE Transactions on Computers, vol. C-34, No. 7, Jul. 1985, pp. 666-673, "The Shift X Parity Watch Algorithm for Raster Scan Displays".
IBM Technical Disclosure Bulletin, vol. 27, No. 10B, Mar. 1985, pp. 6060-6061, "Raster Shader".

Primary Examiner—Gerald L. Brigance
Attorney, Agent, or Firm—Pollock, VandeSande & Priddy

[57] ABSTRACT

The invention relates to a graphic display device. The main object of the invention is a screen display device using a combination of directed-beam scanning for drawings of patterns and frame-scanning display for surface coloring. The device of the invention comprises a microprocessor which makes real-time calculations, for each line displayed, of the starting and finishing abscissae of the various colors to be used. Real-time computing by the microprocessor makes it possible to use video memories instead of the habitually used page memories and to replace a very bulky and expensive graphic processor with a fast microporocessor. The invention can be applied chiefly to the display of three-dimensional perspective views on color screens.

12 Claims, 6 Drawing Sheets

FIG_1
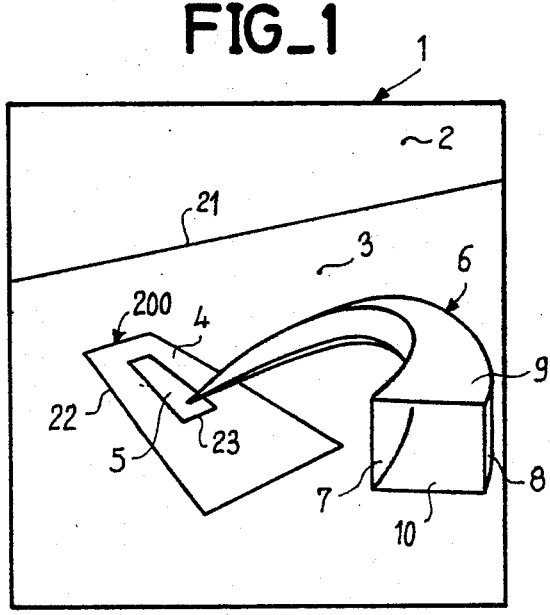
FIG_4
PRIOR ART
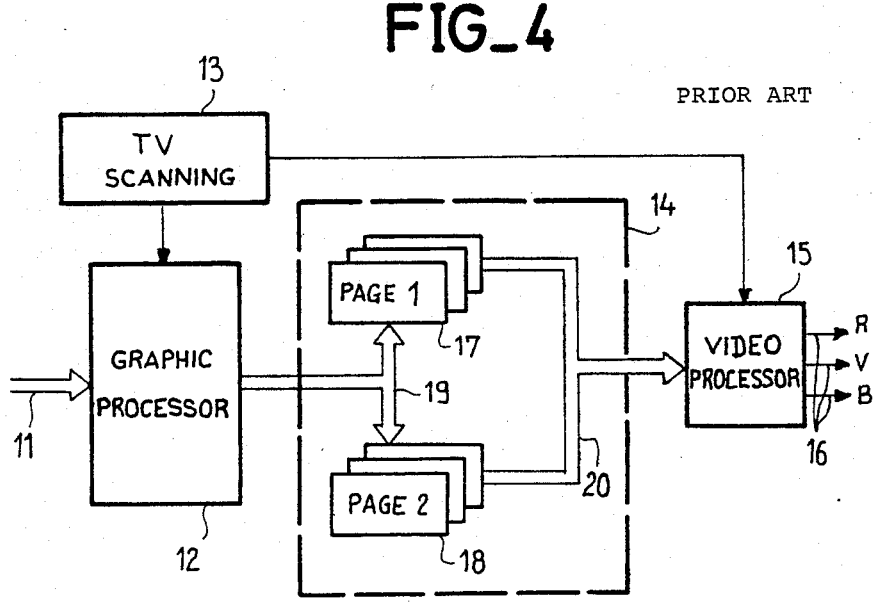

FIG_2
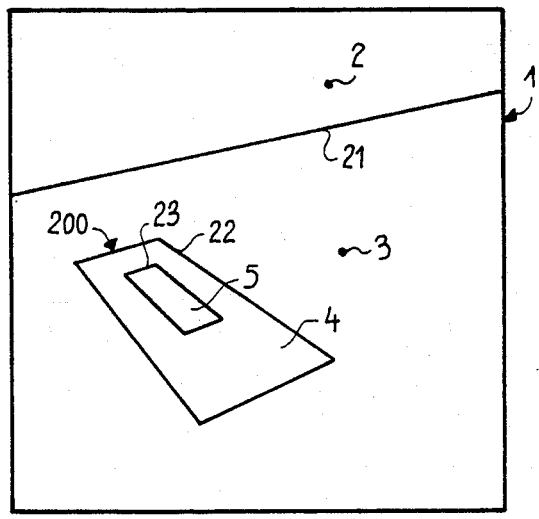
FIG_3
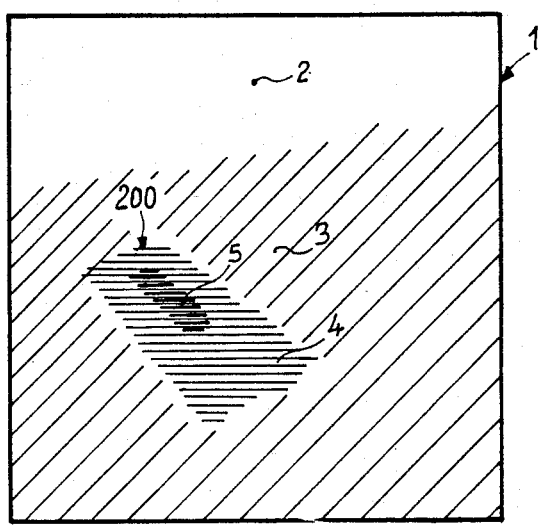

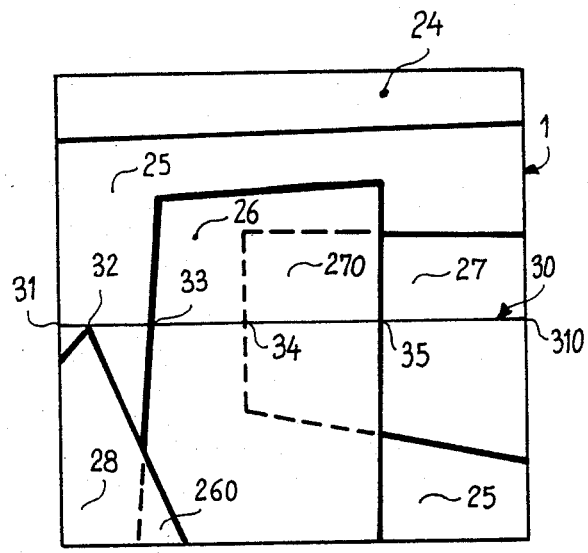
FIG_5
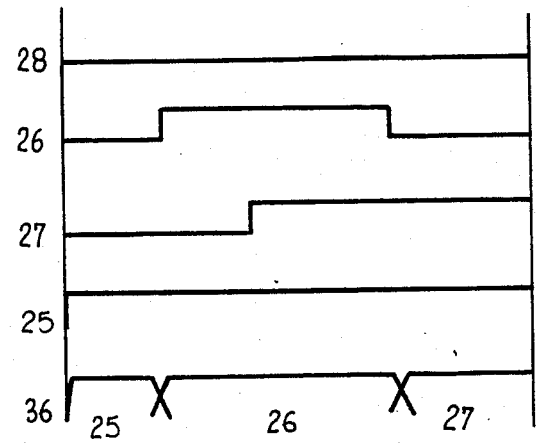
FIG_6
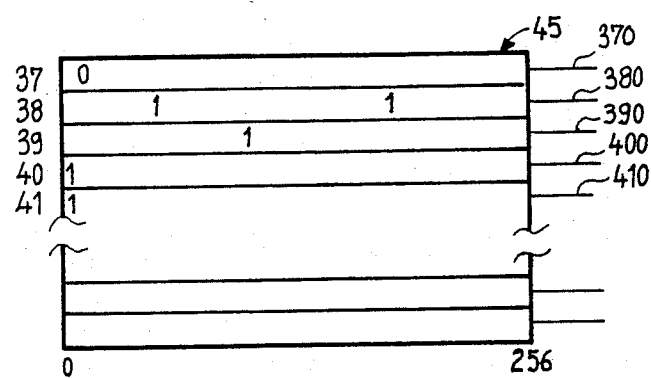
FIG_7

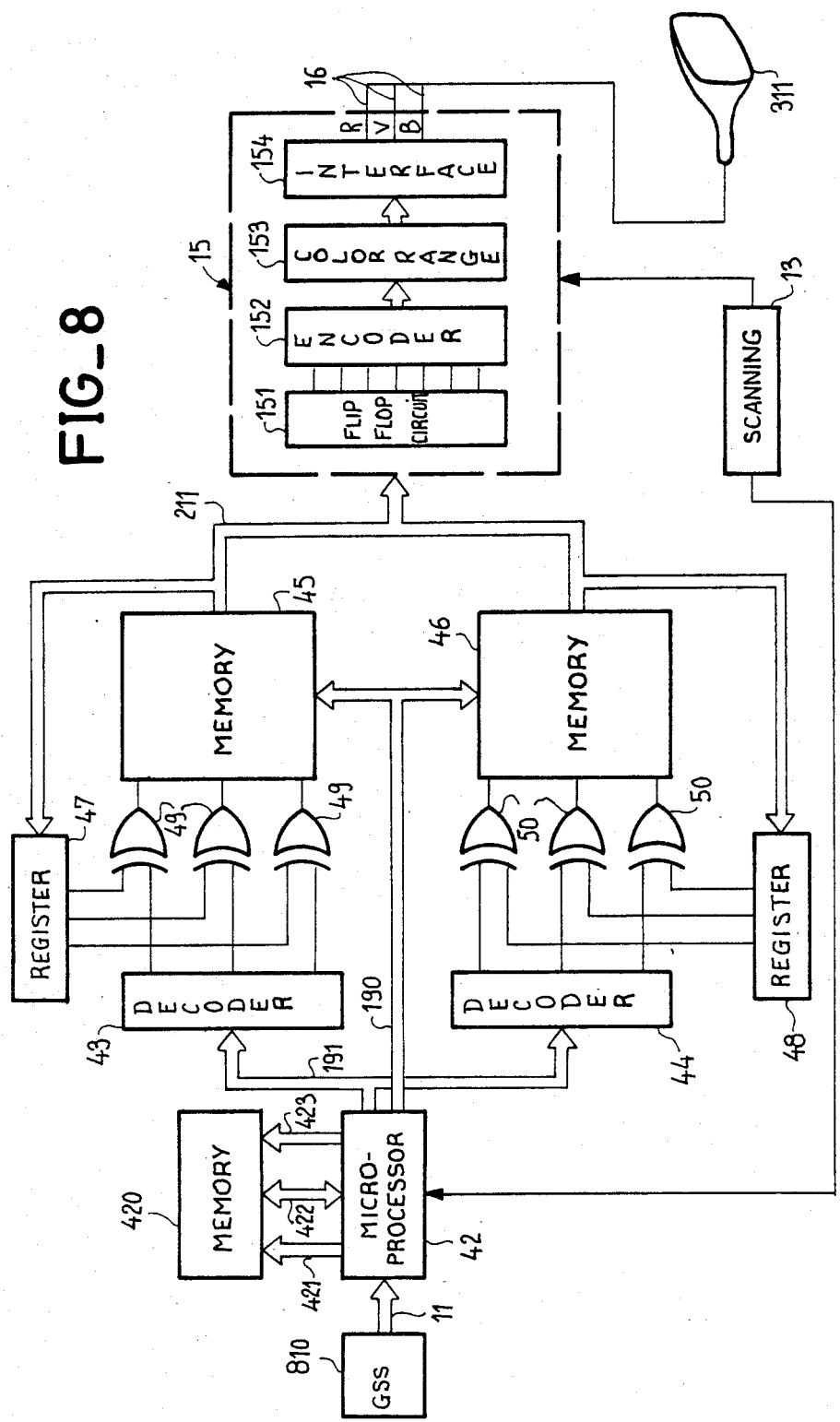

FIG_9
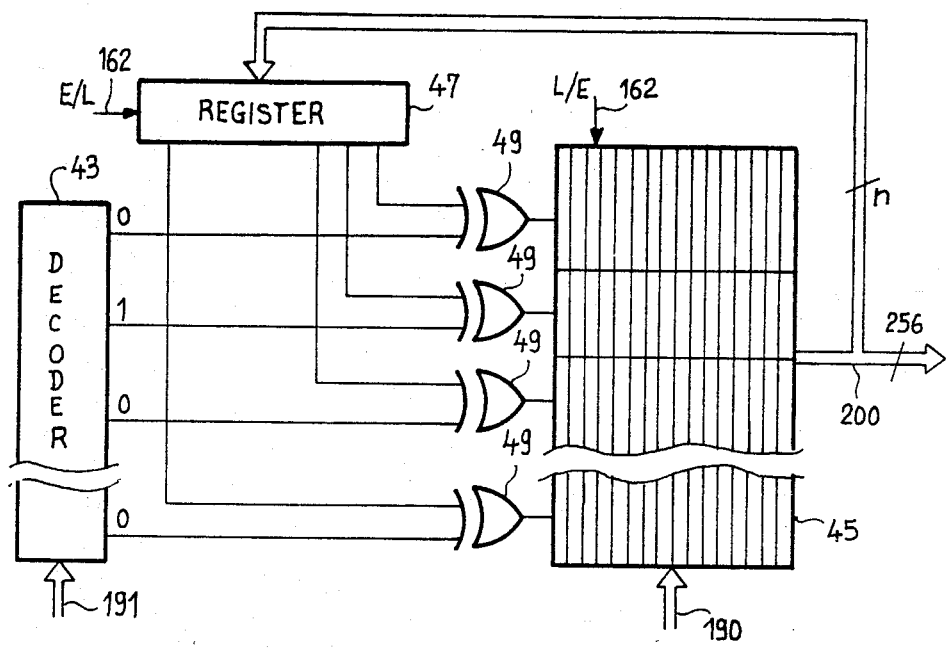
FIG_10
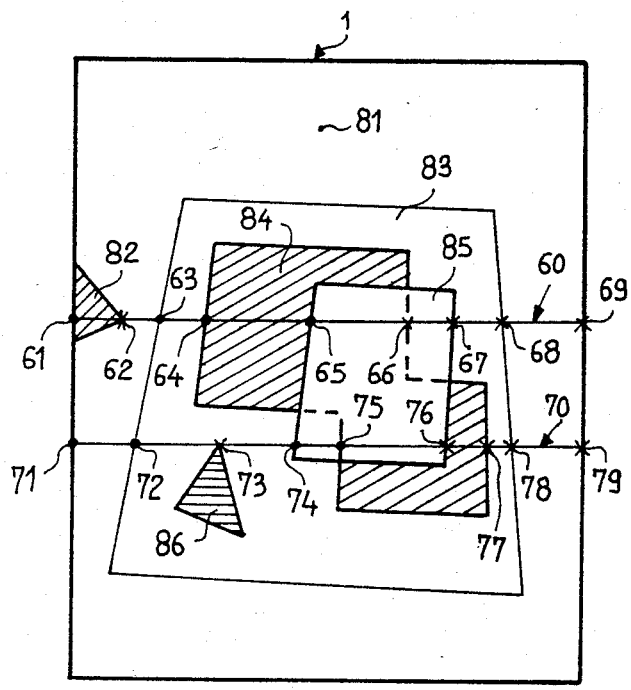

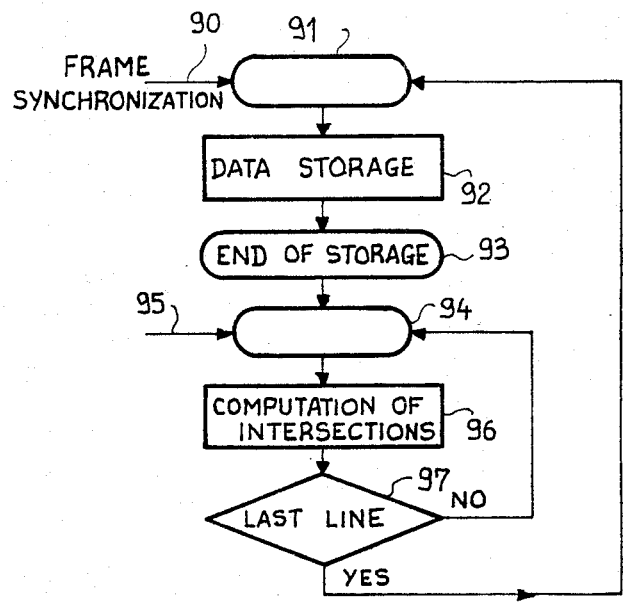
FIG_11
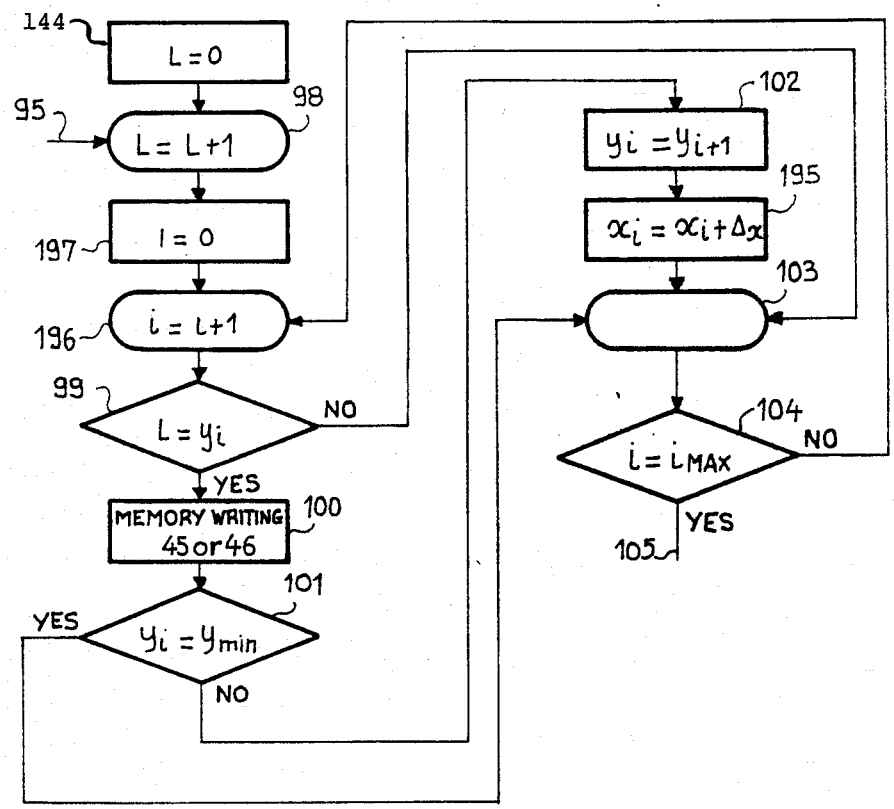
FIG_12

GRAPHIC DISPLAY DEVICE

BACKGROUND OF THE INVENTION

The present invention pertains mainly to a graphic display device.

Display devices of the prior art store entire images in video memory, necessitating high storage capacity.

It is becoming increasingly more frequent for people to work in front of display devices. For example, computer terminals have a cathode tube display screen. With the increasing amount of time spent in front of these screens, it is becoming necessary to improve the quality of the display in order to enhance visual comfort. This is especially important where major decisions have to be taken on the basis of screen-displayed data. The quality of the display at the instruments is becoming vital for the piloting of aircraft since measurements are displayed on cathode screens.

SUMMARY OF THE INVENTION

The device of the invention is particularly efficient in displaying three-dimensional perspectives on a screen. The device of the invention uses directed-beam scanning to draw patterns or symbols and frame scanning in order to obtain colored zones.

The device according to the invention comprises a fast microprocessor which makes real-time computations, for each frame line, of the starting and finishing abscissa for the display of each color. The use of a fast microprocessor computing the data displayed for each line in real time substantially reduces the size of the video memories used. This advantage is a major one particularly for equipment designed to be placed aboard aircraft where there is restricted room and where the weight of the equipment aboard is a determining factor.

The main object of the invention is a graphic display device comprising a frame-scanning color screen, where the display is obtained by filling in colored zones delimited by boundaries, comprising a microprocessor which successively computes, for each line of a frame, the intersection points of the said frame line with the said boundaries of the colored zone.

BRIEF SUMMARY OF THE DRAWINGS

The invention will be better understood from the following decription and the appended figures which are given as non-exhaustive examples, wherein:

FIG. 1 is a drawing of a visual display screen;

FIG. 2 is a simplified drawing of the patterns to be drawn on a screen;

FIG. 3 is a drawing of the various color zones to be displayed;

FIG. 4 is a diagram of the device of a known type;

FIG. 5 is a drawing of the color zones to be displayed;

FIG. 6 is a diagram illustrating the encoding of the colors in FIG. 5;

FIG. 7 is a diagram of the content of the line memory corresponding to the coding of FIG. 6;

FIG. 8 is a diagram of the device according to the invention;

FIG. 9 is a diagram of a detail of an embodiment of the device according to the invention;

FIG. 10 is a drawing of a displayed image;

FIG. 11 is a flowchart of the programme used by the device according to the invention;

FIG. 12 is a flowchart of a sub-programme of the programme of FIG. 11.

FIGS. 1 to 12 use the same references to designate the same elements.

DESCRIPTION OF THE PREFERRED EMBODIMENT

FIG. 1 shows an example of a drawing whose appearance on the screen 1 facilitates the pilot's task of performing an aircraft landing. The drawing comprises a simplified diagram of landing strips 200 as well as a tunnel 6 which corresponds to the optimized trajectory for the landing of the aircraft. The drawing comprises a view of the sky 2 and of the earth 3. The display of landing strip 200 comprises a central zone 5 corresponding to the place where the plane may touch down with the greatest safety as well as a peripheral zone 4. The tunnel 6 comprises four sides 7, 8, 9, and 10. The device according to the invention, will draw, by directed-beam scanning, for example on a cathode tube, the patterns corresponding to the horizon, the boundary between the sky 2 and the earth 3, the boundaries 22, 23 of zones 4 and 5 respectively, of the landing strip 200 as well as the visible ridges of the tunnel 6. Directed-beam scanning gives a very clear drawing which is very easy for the pilot to perceive and interpret. The device according to the invention will enhance visual comfort by assigning different colors to the sky 2, the earth 3, the zones 4 and 5 of the landing strip 200 as well as the corridor 6.

The device according to the invention may advantageously receive data (from an image synthesizer) respecting the location of concealed sides of three-dimensional objects such as the landing corridor for example.

The device according to the invention is capable of using this data to use the only color visible at each point on the screen. The colors are filled in by frame scanning which is faster than directed-beam scanning.

FIG. 2 shows, on screen 1, the pattern drawn in directed-beam scanning which corresponds to the horizon 21 and to the boundaries 22 and 23 respectively of zones 4 and 5 of the landing strip 200. For the clarity of the drawing, the corridor 6 has not been drawn in FIG. 2. Directed-beam scanning with a shadow-mask tube is done in a way known in the prior art.

FIG. 3 shows the filling in of the colors of the sky 2, the earth 3 and the zones 4 and 5 of the landing strip 200. The zones 2 to 5 are colored by frame scanning during those periods which are not used for directed-beam scanning by the tube. For example, an 8 ms period of directed-beam scanning is followed by an 8 ms period of frame scanning and so on.

FIG. 4 shows a device for the display of synthesized images on cathode tubes of a known type. This device comprises a graphic processor 12 linked to an image memory 14. The image memory 14 is linked to a video processor 15 which directly controls the red, green and blue electron guns of the shadow-mask cathode tube which is not depicted. A frame-scanning circuit 13 is linked to the graphic processor 12 and the video processor 15. The graphic processor 12 receives the images generated by a generator of surface symbols (GSS) through a bus 11. It stores these images in the image memory 14. The image memory is a memory comprising several layers used to store the data needed to constitute an entire image. The writing of the image store comprising an entire image requires very powerful graphic processors.

The device of the prior art advantageously uses an image memory comprising two pages 17 and 18. When the graphic processor writes either of the memory pages 17 or 18, the other page 18 or 17 is used to generate the desired image on the screen. The graphic processor 12 is linked by a bus 19 to the memory pages 17 and 18. The memory pages 17 and 18 are linked by a bus 20 to the video processor 15. The frame-scanning circuit 13 is used to synchronize the addressing of the pages of the image memory 14 with the display. The frame-scanning circuit 13 has counters. The video processor 15 generates analog signals which are used to directly control the electron guns of a color cathode ray tube. The signals 16 actuate the red, green and blue guns, thus making it possible to obtain the desired colors.

FIG. 5 depicts an example of the figures to be displayed on the screen 1. The same scale is used for FIGS. 5, 6 and 7. The image to be displayed comprises surfaces 24, 25, 26, 27, and 28 with different colors. The surfaces are considered to be enclosed surfaces, enclosed as the case may be by the edges of the screen 1. In certain instances, the surface of one color overlaps a portion of a surface of another color, for example, the portion 270 of the surface 27 is overlapped by the surface 26. Similarly, the portion 260 of the surface 26 is overlapped by the surface 28.

The device according to the invention processes each line to be displayed in real time. Take, for example, line 30. It cuts the surface 25 at point 31 and at point 310. The line 30 cuts the surface 28 at point 32. The line 30 cuts the surface 26 at points 33 and 35. The line 30 cuts the surface 27 at points 34 and 310. The line 30 does not cut the surface 24.

FIG. 6 shows the timing diagrams corresponding to the display of the various colors on line 30 of FIG. 5. A high logic state corresponds to the presence of the color and a low logic state to the absence of the color. The curves 25, 26, 27 and 28 represent the presence or the absence of colors of the surfaces 25, 26, 27 or 28 on the line 30 of FIG. 5. The curve 36 shows the encoding, resulting from the colors to be displayed for line 30, done by the microprocessor of the device according to the invention. This encoding is effected taking account of the color priorities resulting from the existence of a drawing of concealed surfaces behind the visible ones. Thus, for example, the region 270 of the surface 27, hidden by the surface 26, will not appear on the screen.

FIG. 7 shows the filling of a line video memory in which the presence and absence of the various colors are registered. This memory comprises as many words as there are colors to be displayed. For example, the line video memory comprises 16 words. The length of the word, expressed in bits, corresponds to the number of image elements or pixels. For example, for a small-sized tube comprising 256 pixels, words of 256 bits are used. The words 37, 38, 39, 40 and 41 respectively correspond to the surface colors 28, 26, 27, 25 etc. A "1" is registered in the memory word of a given color, at the address corresponding to the number of the pixel where the boundary of the said color is crossed at the line 30. By an advantageous feature of the invention, there is no "1" registered for images that flow over the screen and therefore, end at point 310 of FIG. 5. Furthermore, there remain isolated "1"s corresponding to the singular point, for example, point 32. Since this "1" is subsequently eliminated, it is not shown in the figure. All the words corresponding to all the colors are read in parallel by lines 370, 380, 390, 400, 410 and so on.

FIG. 8 gives the general diagram of the device according to the invention. The device comprises a microprocessor 42 linked to a line video memory 45 and a video processor 15.

According to an advantage of the invention, the device has a register 47 and a decoder 43 linked by "exclusive-OR" logic gates to the video memory 45 making it possible to process the singular points for which no color change is desired.

According to another advantage, the device of the invention comprises a second line video memory 46 linked to a register 48 and a decoder 44 by "exclusive-OR" logic gates 50. A frame-scanning circuit 13 is connected to the microprocessor 42 and the video processor 15. The microprocessor 42 receives the digitized data on the image to be displayed through a bus 11. This data comes from an image synthesizer 810, a digital optical disk or an analog-to-digital converter connected to a video recorder or television camera. The microprocessor 42 is linked by a bus 191 to the decoders 43 and 44. The bus 191 transmits the priorities assigned to the various colors for which a displaying capability is sought. The microprocessor 42 is linked by an address but 190 to the memories 45 and 46. The memories 45 and 46 are linked by a bus 211 to the video processor 15. Furthermore, the bus 211 links the memories 45 and 46 to the registers 47 and 48 respectively. The registers 47 and 48 are linked to the memory 45 by means of the same "exclusive-OR" circuits 49 and 50 as the decoders 43 and 44, respectively. The microprocessor 42 is associated with a RAM memory 420. The microprocessor 42 is connected to the memory 420 by a data bus 422, a control bus 421 and an address bus 423.

The microprocessor 42 advantageously comprises an internal RAM replacing the RAM 420. For example, the TMS 320 microprocessor, sold by Texas Instruments, has a fast-access internal memory of 144 16-bit words.

The microprocessor 42 computes, for each frame-scanning line, the coordinates of the intersection of the scanning line with the boundaries of the surfaces to be colored. In FIG. 5, these intersection points bear the reference numbers 31, 32, 33, 34, 310. The process of displaying the image on the screen comprises two steps. In the first step, the skeleton of the image with references 21, 22 and 23 in FIG. 2 are plotted by directed-beam scanning. In the second step, the surfaces are colored by means of frame-scanning. During the first step, the microprocessor 42 stores the parameters defining the boundaries in tabular form in the memory 420. In the second step, the microprocessor 42 computes the coordinates of any intersection that is made by each boundary with the frame line. These coordinates of intersections are stored, as and when they are computed, in either of the two line memories, for example line memory 45 or 46. The coordinates loaded in the memory 45 will be used to display the following line. Simultaneously, the other memory, in this case the memory 46, is used for the current display of a frame line. At the following line, the role of the memories 45 and 46 has to be changed. The memory 46 is erased. The microprocessor 42 will write the coordinates of the boundary/line intersections in the memory 46 while the memory 45 will have the task of displaying the previously computed line.

In an example of an embodiment of the device according to the invention, the video processor 15 comprises a set of n flip-flop circuits 151, one priority encoder 152, one memory 153 and one interface 154. The set of n flip-flop circuits 151 is connected to the bus 211. The flip-flop circuits 151 are connected to an encoder 152 by n lines. The encoder 152 is linked by an address bus to the memory 153. The memory 153 is, for example, a RAM. The memory 153 is linked by a data bus to the interface 154. The interface 154 is linked by analog lines carrying the electron gun signals 16 for example, to electron guns which are used to give the red, green and blue colors of a color cathode tube 311.

The circuit 151 comprises as many flip-flop circuits as there are colors to be displayed. The bus 211 transmits the data on the n colors that are sought to be displayed, for example, 16, in parallel. In this case, each of the 16 flip-flop circuits 151 changes its state each time that a boundary is detected for a color, i.e. when "1" is present at its input. Thus, the flip-flop circuits 151 generate peaks 24 to 28 of the FIG. 5. These peaks enable the encoder 152 to generate the address of the peaks, the color-range memory 153 where the combinations of the densities of the colors red, green and blue needed to obtain each desired color, are stored. The encoder 152 takes the color-display priorities into account. These colors obtained are shown by the curve 36 of FIG. 6. In fact, the encoder 152 generates, during the desired time span, the address in the color-range memory 153 of the desired color within the scanning of a frame line, and then generates the address of the following color and so on until the end of the frame line. In the example illustrated by the curve 36 of the FIG. 6, the encoder 152 generates the address in the memory 153 of the color of the region 25, that of the region 26 and then that of the region 27.

In an initial embodiment of the device according to the invention, the hierarchy of priorities is wired within the encoder 152. Logic gates block the generation of the address in the memory 153 of a color is a color located further up in the hierarchy of priority must also be displayed.

In a second alternative embodiment of the device according to the invention, there is a programmable encoder used to change the order in the hierarchy of priorities. In this case, the encoder 152 receives the desired hierarchical order by means of a bus not depicted in FIG. 8.

The bus linking the encoder 152 to the memory 153 is, for example, a 4-bit bus by which the screen can generate 16 colors. The color-range memory 153 delivers the digital values of the primary color intensities needed to obtain the desired colors. For a RAM color-range 153, the colors can be changed by using a bus (not shown) to load the new combination values of the primary colors red, green and blue which can be used to obtain the said colors. The interface 154 is made up, for example, of three digital-to-analog converters, which drive the electron guns of a cathode tube 311 either directly or by means of a non-depicted amplifier.

In another alternative embodiment, the memory 153 is a permanent memory, for example, a programmable read-only memory (PROM), an erasable programmable read-only memory (EPROM) or an electrically-erasable programmable read-only memory (EEPROM). In this case, it is advantageous to pre-load the desired colors.

It is understood that the video processor 15 is adapted to a screen comprising an RVB type video interface, as, for example, a color tube, an electro-luminiscent screen or a liquid crystal color screen. It is understood, of course, that if there is a directly addressable matrix screen, the video processor 15 and, especially, the interface 154 will be adapted to addressing this type of screen.

FIG. 9 shows a detail of the embodiment of the device shown in FIG. 8. The diagram of FIG. 9 explains the handling, by a system according to the invention, of a singular point, i.e. the handling of a unique point at which a scanned line intersects with a surface. The point 32 of the FIG. 5 as well as the point 73 of the FIG. 10 are singular points. The device of FIG. 9 can be used to avoid changing color at a singular point. The memory 45 is structured in n words of, for example, 256 bits. n is the number of colors which it is sought to display simultaneously on the screen, 256 is an example of the number of pixels sought to be displayed on each line. It is understood that the invention applies to various numbers of colors and numbers of pixels. For example, a computer-assisted design (CAD) work station will use a display of 1024 lines comprising 1024 pixels which can take 128 colors. Before a line is written, the video memory 45 is erased, i.e. it is loaded with zeros at all the addresses. For each intersection of a color boundary with the frame line, a "1" is registered for each of the colors at the coordinate of the said intersection. In each of the words corresponding to a color, the writing is done bit by bit. There is, therefore, no need for a data bus, and only two address buses, 190 and 191, are used. The bus 190 transmits the coordinate where the writing should be done, the bus 191 sends the decoder 43 the colors for which a "1" is sought to be written. The last point registered is transmitted by the bus 211 to the register 47. Each of the output colors from the register 47 is connected by one of the "exclusive-OR" logic circuits 49 to the color inputs of the memory 45. The other input of the "exclusive-OR" logic circuits 49 is linked to the color decoder 43. If the programme is at a singular point, the decoder 43 is commanded to write a "1" for the color or colors concerned, the "1" corresponding to the second intersection of the color or colors with the frame line. Given that the register 47 has stored the previous transition, we will have a "1" at both inputs of the "exclusive-OR" circuits 49. Thus, the logic circuit 49 will deliver a "0" to the video memory 45. Similarly, if no intersection has to be registered, neither at the previous writing operation nor at the current one, the circuit 49 will deliver a "0". But on the contrary, if at only one of two successive writing operations, a "1" is written, corresponding to an intersection, the concerned "exclusive-OR" circuit will deliver a "1" at its output, having a "0" at one of its inputs and a "1" at its other input.

The video memory 45 and the register 47 or the video memory 45 and the register 48 are synchronized by reading-writing signals 162. These signals alternately provide for reading the memory 45 and writing in the register 47 or writing in the memory 45 and reading the register 47. The signals that control the transition from reading-writing to writing-reading 162 of the video memory 45 and the register 47 are generated either by a microprocessor 42 or an external logic unit of a known type, not depicted in the figure.

FIG. 10 illustrates an example of a screen 1 on which it might be desired to display the resultant display and the points to be processed for two frame lines 60 and 70. The screen 1 of FIG. 10 comprises surfaces 81, 82, 83, 84, 85 and 86. As can be seen in the figure, the surface 81 has the lowest priority for it is overlapped by each one of the surfaces 82 to 86. It can also been seen that the surface 83 has a lower priority than surfaces 84, 85 and 86. Thus, each time that a part of the screen covered by the surface 83 and, for example, by the surface 84, it will be colored with the color corresponding to the surface 84. It can also be seen that the surface 84 has a lower priority than the surface 85.

In FIG. 10, two frame lines with references 60 and 70 have been arbitrarily chosen to explain the working of the device according to the invention. In reality, the display of a screen is obtained by directed-beam scanning of patterns and by frame scanning of all the frame lines of screen 1. FIG. 10 depicts the initial boundary of a color by black dots and the second boundary of a color by crosses. The dot 61 corresponds to the intersection of the initial boundary of the surfaces 81 and 82 with the line 60. The cross 62 corresponds to the intersection of the second boundary of the surface 82 with the line 60. The dot 63 corresponds to the intersection of the initial boundary of the surface 83 with the line 60. The dot 64 corresponds to the intersection of the initial boundary of the surface 84 with the line 60. The dot 65 corresponds to the intersection of the initial boundary of the surface 85 with the line 60. The cross 66 corresponds to the intersection of the second boundary of the surface 84 with the line 60. The cross 67 corresponds to the intersection of the second boundary of the surface 85 with the line 60. The cross 68 corresponds to the intersection of the second boundary of the surface 83 with the line 60. The cross 69 corresponds to the intersection of the second boundary of the surface 81 with the line 60.

The dot 71 corresponds to the intersection of the initial boundary of the surface 81 with the line 60. The dot 72 corresponds to the intersection of the initial boundary of the surface 83 with the line 70. The cross 73 corresponds to the intersection of the initial and second boundaries of the surface 86 with the line 70.

The dot 73 is a singular point. For a clear display on the screen, it is necessary that the color of this point should not be changed during the frame scanning. The singular point is processed by the "exclusive-OR" logic circuits 49 and 50 of FIGS. 8 and 9.

The dot 74 corresponds to the intersection of the initial boundary of the surface 85 with the line 70. The dot 75 corresponds to the intersection of the initial boundary of the surface 84 with the line 70. The cross 76 corresponds to the intersection of the second boundary of the surface 85 with the line 70. The cross 77 corresponds to the intersection of the second boundary of the surface 84 with the line 70. The cross 78 corresponds to the intersection of the second boundary of the surface 83 with the line 70. The cross 79 corresponds to the intersection of the second boundary of the surface 81 with the line 70.

FIG. 11 shows the flowchart of the processing programme carried out by a microprocessor 42. The program of FIG. 11 is a program that works continuously throughout the time of display on the screen. The program begins at 91. At this moment, the microprocessor receives a frame-synchronizing signal interrupt 90. After this interrupt, which synchronizes the computation with the scanning of the screen, the program goes from 91 to 92. At 92, the data concerning the display to be made is stored in the memory 420. From 92, the program goes to 93, which corresponds to the end of data storage in the memory 420. The data may be stored, for example, in the form of a table of boundaries comprising the staring line of a boundary as well as the equation that defines this boundary. For this type of data organization, no boundary comprises more than one intersection with any one of the frame lines. Thus, to define an enclosed zone that is to be colored, at least two boundaries are needed.

If the boundaries are all straight line segments, it suffices to store the slope of each boundary in the table of the memory 420, the general equation of all the straight line segments being identical.

These steps correspond, for example, to half the time of the programme carried out by the microprocessor, including the time of waiting for synchronization.

In an example of an embodiment of the device according to the invention, the execution of the part 91 to 93 of the program takes 8 ms per frame.

From 93 the program goes to 94. At 94, the line synchronization interrupt is awaited. This interrupt signal starts the computation of the intersections of the surface boundaries with the processed frame line. From 96 the program goes to 97. At 97 a check is made to see whether the processed line is the last line of the frame. If it is not, the programme returns to 94 where it awaits the line synchronization interrupt which will trigger off the computation of the intersections of the following line at 96. If the processed line is the last line of the frame, the program returns to 91 to await the frame synchronization interrupt 90. The second part of the program, from 94 to 97, also lasts 8 ms in a specific example of an embodiment of the device according to the invention.

FIG. 12 gives a flowchart of the intersection computing sub-routine of the program of FIG. 11. This sub-routine corresponds to the steps 94 to 97 of FIG. 11.

The sub-routine corresponds to the case where the boundaries of the various surfaces are segments of straight lines. All the surfaces which can be displayed on the screen are approximated by sequences of straight lines. In another case, it is possible to define other types of surface boundary comprising straight lines, arcs of circles, ellipses and hyperbolas. Of course, the type of boundaries used must be defined so as to enable computing by the microprocessor 42 of FIG. 8.

The sub-routine of FIG. 12 begins in 144. In 144, the number counter, L, of the processed line is set at "0". The program goes to 98. At 98 a line synchronization interrupt 95 is received. This interrupt starts the computation; L is increased by unity.

From 98 the program goes to 197.

At 197, the index of the boundaries i is set at "0".

The program goes to 196.

At 196 the index of boundaries i is increased by unity. The program goes to 99. At 99 a check is made to see whether the currently processed line L cuts the boundary yi. This data is read in a table contained in the memory 420 of the FIG. 8.

If the line does not cut the boundary yi, the program goes to 103.

If the line does, the program goes to 100. At 100, the intersection $x_i$ is written in the line memory 45 or 46. The program goes to 101.

At 101, a check is made to see whether the boundary yi ends at the intersection point of the memory 420 of FIG. 8.

If the boundary does end, the program goes to 103.

If the boundary does not end, the program goes to 102.

At 102, the fact that the previously processed boundary cuts the frame line lower down is registered in the table of the memory 420 of the FIG. 8. The program goes to 195.

At 195 the abscissa of the previously processed boundary one line lower down is computed and stored in a table of the memory 420. The program goes to 103.

From 103 the program goes to 104.

At 104 a check is made to see whether the computing of the intersections for all the boundaries stored in the table of the memory 420 of the FIG. 8 is completed. If it is, the program goes to 105 which corresponds to the end of a sub-routine. For example, the execution of the sub-routine of FIG. 12 lasts 8 ms.

The device according to the present invention can be applied mainly to high-quality color display. The invention can be applied especially to displaying three-dimensional perspective views on color cathode screens.

What is claimed is:

1. Graphic display device comprising a combination directed beam and frame-scanning color screen, the display being obtained by the filling in of colored zones delimited by boundaries, the device comprising a microprocessor which successively computes for each frame line, the intersection points of the frame line with the boundaries of the colored zones, said microprocessor including first means for coloring a given frame line, and second means for simultaneously computing the intersection points of said boundaries with a frame line following said given frame line and wherein said boundaries of the colored zones are drawn on the screen by directed-beam scanning.

2. Device according to claim 1 wherein the screen is a shadow-mask color cathode tube.

3. Device according to claim 1, comprising a video memory capable of storing a frame line to be displayed.

4. Device according to claim 3, comprising two video memories wherein, alternately, one video memory is used to write data to be displayed on a given frame line while the reading of the other video memory provides for the display of a frame line preceding said given frame line.

5. Device according to claim 3, comprising a register connected to the output of said video memory and "exclusive-OR" logic gates connected in between, on the one hand, the memory input and the register output and, on the other hand, the microprocessor output so as to avoid registration in the video memory of the existence of a multiple intersection, at one point, between a frame line and a boundary of colored zones.

6. Device according to claim one wherein the said device is a device for the display of three-dimensional perspective views.

7. Device according to claim one comprising a video processor which as a color-range memory in which are stored the intensities of primary colors needed to obtain desired colors associated with an interface comprising a digital-to-analog converter associated with each primary color generator.

8. Device according to claim 3 wherein the video memory is arranged in n words, each with a number of bits equal to the number of pixels per frame line, n being the maximum number of colors that can be used.

9. Device according to claim 8, comprising flip-flop circuits, parallel connected to the output of each word of the video memory, each flip-flop circuit changing its logic state when it receives a "1", the flip-flop circuits being connected to a priority encoder, which is itself connected to the color-range memory.

10. Method for screen display, by frame scanning, of colored zones delimited by boundaries displayed by directed-beam scanning, wherein a microprocessor stores, in a RAM, data relating to the frame scanning, the said microprocessor computing, in real time, the abscissa of all of the intersection points of each frame line with the boundaries of the colored zones during frame scanning of the immediately preceding frame line.

11. Method according to claim 10 wherein the boundaries of the colored zones are segments of straight lines.

12. Method according to claim 10 wherein the said method displays perspective views of three-dimensional objects including determining hidden sides of the said objects and priority colors determined by overlapping zones of two colored zones.

* * * * *